May 26, 1925.
R. CALLAHAN ET AL
1,539,071
GREASE DISTRIBUTING APPARATUS
Filed March 30, 1922   3 Sheets-Sheet 2
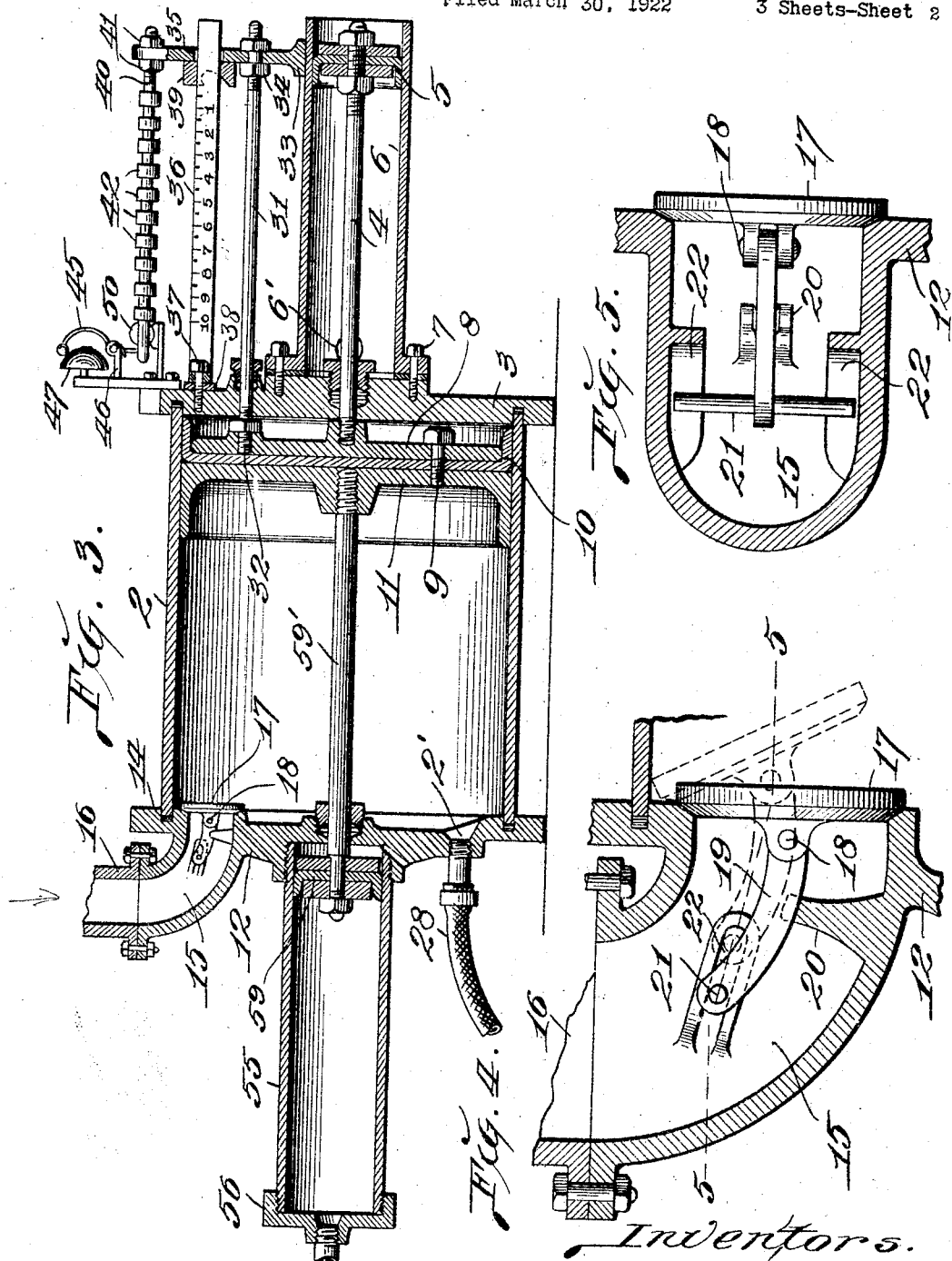
Inventors.
Richard Callahan and
Stephen Rouleau.
By Hazard & Miller attys.

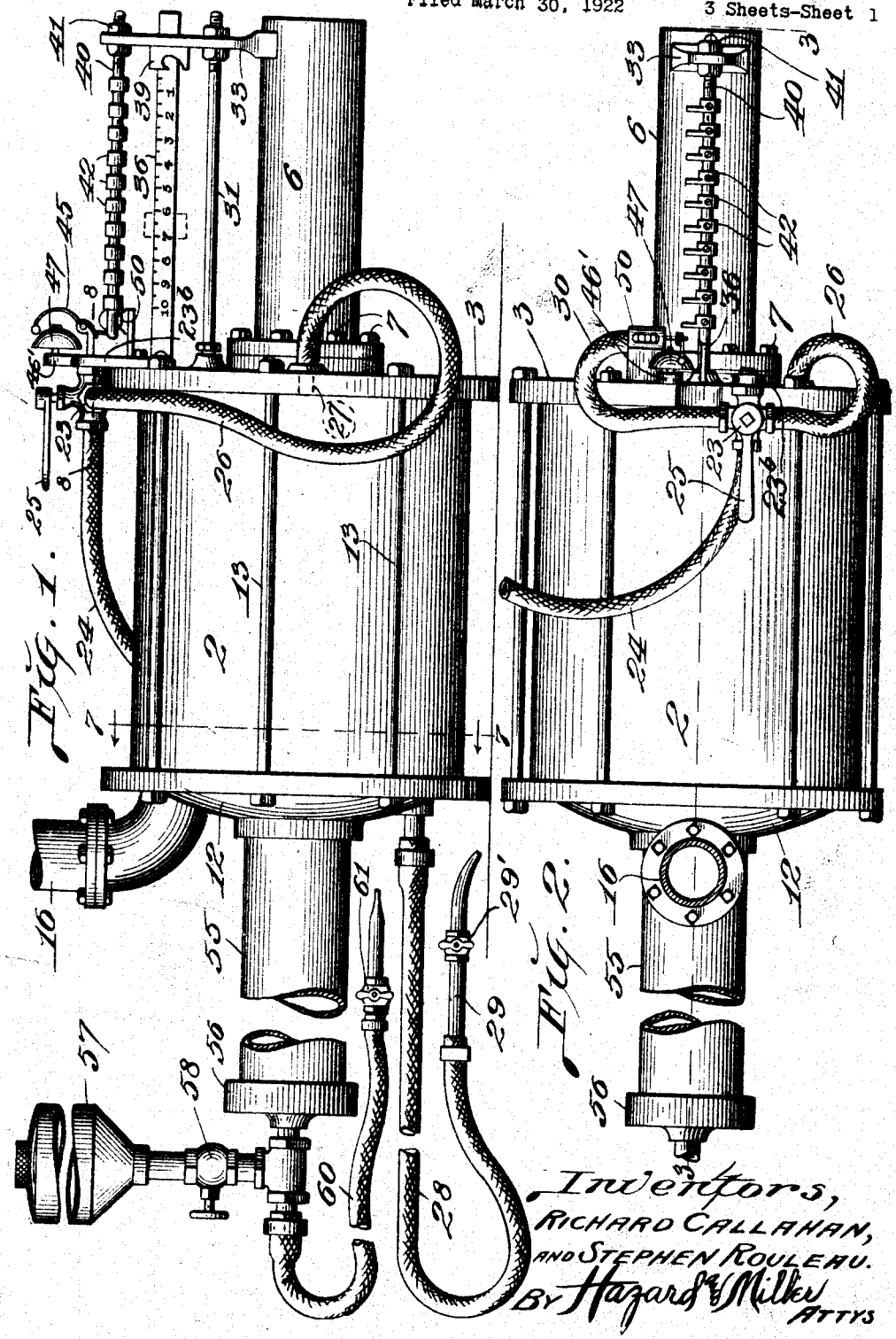

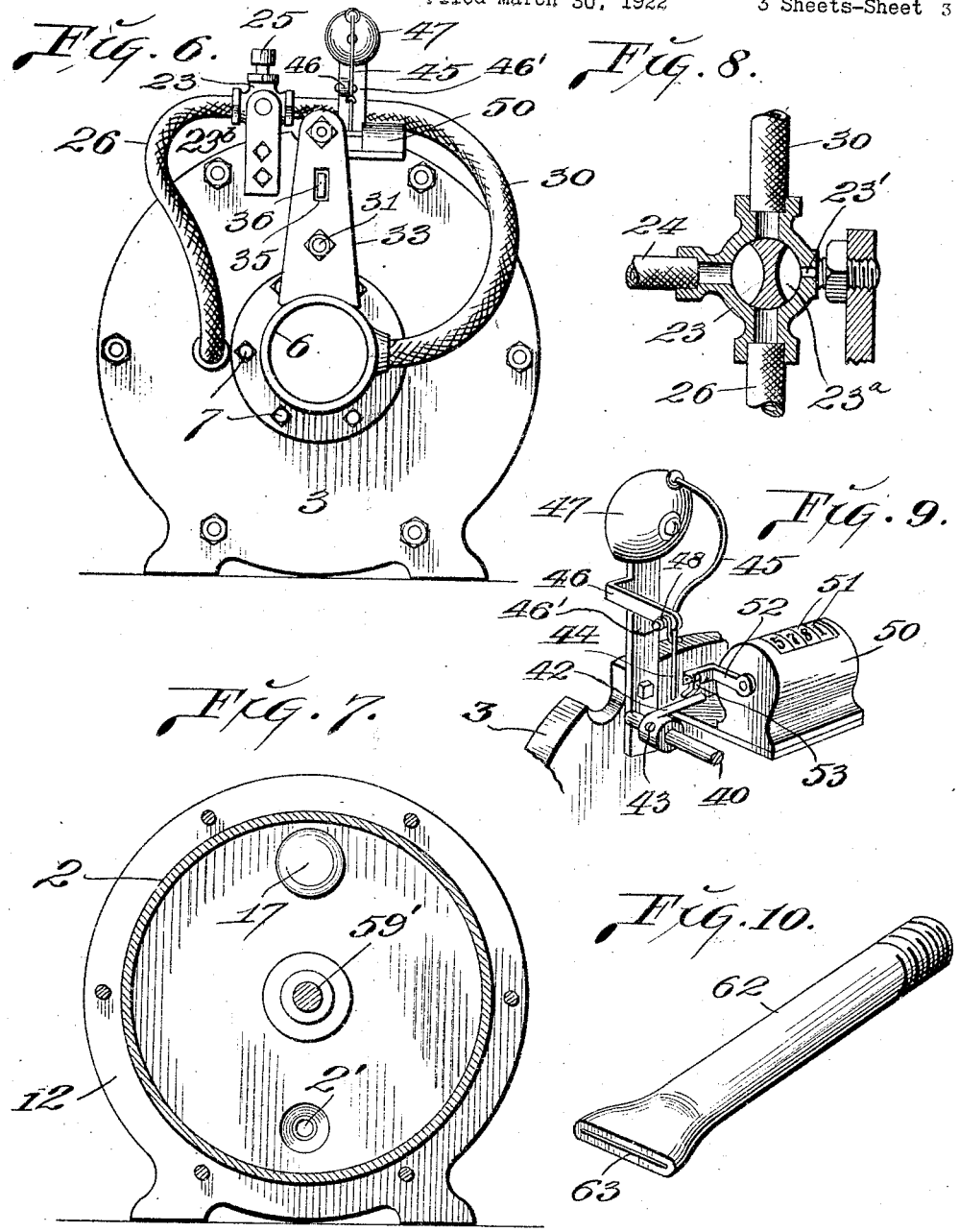

Patented May 26, 1925.

1,539,071

UNITED STATES PATENT OFFICE.

RICHARD CALLAHAN AND STEPHEN ROULEAU, OF LOS ANGELES, CALIFORNIA.

GREASE-DISTRIBUTING APPARATUS.

Application filed March 30, 1922. Serial No. 548,020.

*To all whom it may concern:*

Be it known that we, RICHARD CALLAHAN and STEPHEN ROULEAU, citizens of the United States, residing at Los Angeles, in the county of Los Angeles and State of California, have invented new and useful Improvements in Grease-Distributing Apparatus, of which the following is a specification.

This invention relates to pneumatically operated grease dispensing and measuring apparatus.

It is an object of the present invention to provide an apparatus having a main grease chamber provided with a supply valve which will automatically close on a dispensing stroke of a piston in the cylinder so that grease therein will be forced through a distributing or dispensing attachment means being provided for pneumatically operating the piston in the chamber in both its discharge and in its return strokes.

A further object of the invention is to provide a simple, practicable measuring and signalling device combined with the apparatus in such manner as to give an accurate indication of the amount of grease dispensed and at the same time to produce an audible signal giving notice of operation of the device, and further to provide means for automatically recording the amount of grease discharged.

A further object is to provide in combination with a grease discharging means, a supplementary device for discharging from an attached but separate compartment in the apparatus, a lubricant of a different or specified character from that dispensed from the main chamber of the apparatus.

A further object of the invention is to provide in combination with a grease dispensing apparatus, a novel discharge nozzle for effectively applying the lubricant between the leaves of a leaf spring structure.

A further object is to provide a simple and effective supply and check valve in combination with the main chamber of the apparatus.

One embodiment of the invention is herein described and illustrated in the accompanying drawings, in which—

Figure 1 is a side elevation of one embodiment of the invention; the supplementary or special dispensing chamber being broken away.

Fig. 2 is a plan view of the apparatus.

Fig. 3 is a central longitudinal vertical section of the apparatus on line 3—3 of Fig. 2.

Fig. 4 is a detail view in section of the main supply and check valve, the section being in a vertical plane.

Fig. 5 is a horizontal section on the line 5—5 of Fig. 4.

Fig. 6 is a front end view of the apparatus.

Fig. 7 is a cross section on line 7—7 of Fig. 1 through the main chamber.

Fig. 8 is a longitudinal section through the three-way valve on line 8—8 of Fig. 1.

Fig. 9 is a perspective of the audible signal device and an associated recording instrument.

Fig. 10 is a perspective of a form of nozzle for lubricating laminated springs consisting of leaves.

In the illustrated embodiment of the invention there is shown a main cylinder 2 having at one end a head wall 3 through the center of which passes a tail rod 4 carrying a piston 5 reciprocating in a tubular chamber 6 which is of considerably less diameter than the main chamber 2, and which is secured as by fastening bolts or screws 7 to the outer face of the head 3.

The inner end of the tail rod 4 is shown as screwed in the central portion of a plate or disc 8 fastened as by means of screws 9 against a packing disc or cup 10, the body of which bears against a piston 11 slidably fitting in the main cylinder or chamber 2. The opposite end of the chamber 2 is provided with an end wall 12, and longitudinally extending exterior fastening rods 13, Fig. 1, are shown as effectually clamping the head 3 and the end wall 12 against the ends of the cylindrical chamber wall 2. The opposed faces of the head 3 and the wall 12 are respectively shown as grooved as at 14 to receive the ends of the cylinder 2.

In the upper portion of the end wall 12 there is provided an intake port 15 which may be suitably connected as by a pipe 16 to any suitable source of supply of material which is to be dispensed from the main chamber 2, and which in the present case is designed to contain and dispense grease for the lubrication of mechanical organizations.

In the lower and discharge end of the port 15 there is provided a check valve in the form of a disc 17 opening inwardly and having a pivotal connection as at 18 to the adjacent end of a link 19 which is in the present case shown as arcuate in elevation and is adapted to bear upon a lug 20 projecting upwardly from the bottom wall of the port 15. Through one end of the link 19 there extends a transverse pin 21, the ends of which are engaged in guideways 22 provided therefor on diametrically opposed, side walls of the port 15. In action, when the piston 11 moves toward the cylinder head 3, a suction is created in the port 15 and a supply of the grease is drawn inwardly the effect of which is to swing the valve 17 to the position shown in dotted lines in Fig. 4. Upon a return stroke of the piston 11 toward the check valve the latter is forced closed by the pressure of the material in the chamber 2, and during the change of position of the valve 17 the cross pin 21 of the link 19 slides to and fro in its guideways 22.

The main piston 11 is reciprocated preferably through the medium of compressed air and this is controlled by means including a three-way valve 23 shown in Fig. 1 as supported on a bracket 23$^b$ and as having a pressure line 24 leading to a source of supply. When the three-way valve closure is set as is indicated in Fig. 8, it is in the neutral pressure cutting-off position, and when it is desired to drive the piston 11 on its discharging stroke in a direction away from the head 3, the valve closure is so turned by its handle 25 as to permit the flow of air into a conduit, for instance the hose 26 which is connected to a port 27 shown in dotted lines in Fig. 1 in the head 3, so that the air pressure becomes effective between the head and the piston 11 to force this under the desired degree of pressure in its dispensing stroke during which time the grease therein is forced through an outlet port 2' adjacent the bottom of the end wall 12 for instance, and through a discharge and distributing connection as a tube 28 to the end of which may be attached any suitable nozzle, a form of which is indicated at 29, Fig. 1.

When the piston in the course of its use has been driven to the limit of its discharge stroke toward the wall 12 of the chamber 2, it is then returned to its starting position by the utilization of compressed air which, in the present case, is turned into a conduit in the form of a hose 30 leading from the control valve 23 into one side or other of a suitable portion of the auxiliary chamber 6 which is provided with an air port 6', Fig. 3, to which the hose 30 is connected. As air pressure enters the auxiliary cylinder 6 behind the piston 5, the latter is forced outwardly in its cylinder and by means of the tail rod 4 retracts the main piston 11 to the starting position.

One of the features of this invention resides in means for accurately indicating the quantity of grease discharged from the main chamber 2 and further which will give an audible signal of the operation of the apparatus. A device is incorporated with said indicating and signalling means for recording the total volume of the substance discharged from the apparatus. Also the dispensing scale includes means for readily disclosing the amount discharged at each discharging stroke of the main piston 11, so that the purchaser, the attendant and the other person in charge of the apparatus may have a reliable index as to the amount dispensed at each sale.

To that end, there is shown as attached to the piston plate 8 a rod 31, one end of which is threaded as at 32 in the plate 30 as to provide for adjustment of the rod if desired. The rod passes through an aperture provided therefor in the head 3, and its outer end is threaded and is slidably mounted in a forked member 33 having its forked end slidably mounted upon the adjacent portion of the cylinder 6 so as to be guided thereby. Adjustment of this member 33 is facilitated as by means of the threaded end of the rod 31 upon which are mounted clamping nuts 34 on the sides of the fork member 33. This member is perforated at 35 to provide for the reception of a graduated scale member 36, one end of which is fastened as by a screw or other means 37 to the upper portion of the head 3. Adjustment of the scale 36 is provided for by the insertion of one or another of washers 38 having different thickness beneath the end thereof which is attached to the head 3.

In the present case the scale 36 is graduated for pounds and half pounds, and upon it there is slidably mounted an index member 39 which in its outermost position is designed to register with the zero or first mark on the outer end of the scale 36. The indicating block 39 is slidable on the scale 36 and is free of the yoke member 33, so that when this member is pulled in one direction by the discharging stroke of the piston 11 it engages the block 39 and shifts it along the scale 36 to a position determined by the stopping of the discharge stroke of the piston 11. Then when the piston is returned by the admission of air into the return or auxiliary chamber 6, it will be seen that the fork or guide member 33 is pushed outwardly and will leave the indicating block 39 at its effective indicating position so that the purchaser, the operator and other interested people can see at a glance what the amount of substance discharged was at each sale or at each reciprocation of the piston 11 in its discharging action.

To give an audible signal at each use of the apparatus, a suitable means is provided and this is shown as consisting of a rod 40 adjustably mounted in the upper end of the actuating member 33 and secured as by means of nuts 41. Along this rod 40 is provided a series of tappets in the nature of fingers 42 which may be adjusted and secured in suitable position as by means of set screws 43 passing through the hubs of the tappets and engaging the rod 40. The tappets all project transversely as to the rod 40 and are designed to engage the downwardly extending arm 44 of a bell hammer 45 which is pivoted on an arm 46 a bracket 46' provided as on the head 3. When the rod 40 shifts with the discharging action of the piston 11, the tappets 42 successively strike the arm 44 of the hammer and this is oscillated to strike a bell 47. The hammer 45 may be thrown in its striking direction as by a spring 48. Upon the retracting movement of the rod 40 with the tappets 42, the arm 44 is designed to yield sufficiently to permit the tappets to clear.

Combined with the scale device and the signal device is a recording instrument which is indicated as including a housing 50 in which is arranged a set of registering wheels 51 designed to be actuated as the rod 40 moves in one direction with the discharge stroke of the piston 11. The recording instrument is shown as provided with an arm 52 having an inclined abutment 53 which is arranged to be engaged by the tappets 42 as they are shifted thereagainst. Upon the return stroke of the tappets, the inclined abutment 53 is adapted to yield and thus clear the tappets without actuating the recording instrument.

The apparatus is designed to be useful in the dispensation of a plurality of kinds or grades of substances and is therefore provided at the discharge end with a supplemental pressure chamber 55, one end of which is mounted on the discharge wall 12 and the outer end of which is provided with a cap 56 to which is adapted to be connected a supply receptacle 57 for holding a special or given substance to be dispensed. A valve 58 is introduced between the receptacle 57 and the supplementary chamber 55 so that a piston 59 in the chamber 55 may be reciprocated freely. This piston 59 is shown as attached by a connecting rod 59' to the main piston. When it is desired to discharge a substance from the receptacle 57, the valve 58 is opened and on the suction stroke of the pistons 59 and 11 a volume of the material from the receptacle will be drawn into the supplementary cylinder 55. Then the valve 58 is closed and on the discharge stroke of the piston 59 the substance will be driven through a distributing hose 60 in the end of which may be provided a valve controlled nozzle 61.

For the purpose of facilitating the lubrication of laminated springs, there is combined with the device a nozzle 62 which may be attached to the distributing hose 60 or to the distributing hose 28. This nozzle 62 has its discharge end provided with a flat elongated mouth 63 to form a comparatively thin discharge end which may be forced between the leaves of a spring.

During the manipulation of the device when the closure of the valve 23 is in either position to supply air pressure for the pistons 5 and 14, an exhaust to prevent back pressure is provided by a bleed or relief port 23' in the valve body 23 to register with a complementary bypass 23ª in the valve plug.

In operation of the apparatus substance from the chamber can be discharged by admission of air pressure behind the piston 11, which forces the substance through the distributing pipe 28, the nozzle 29 of which may have a control valve 29' which when opened will permit the discharge of the substance under the pressure of the piston 11. At this time the valve 58 of the supplementary dispensing chamber 55 is open so that substance in the dispensing chamber will be forced back through the open valve 58 into the supply receptacle 57. On the other hand, when it is desired to discharge a substance with any desired degree of pressure, which may be up to three thousand pounds per square inch, then the valve 58 is opened to supply substance to the dispensing chamber 55, then on the pressure stroke of the piston 11 the material will be forced through the tube 60 under the control of the valve 61. At this time the substance from the main chamber 2 is returned to its source; for instance, by locating the discharge nozzle 29 of the tube 28 in the source to which the supply pipe 16 is connected; in other words, the material discharged from the main chamber 2 is returned to its source if desired when the apparatus is operated for the discharge of material under high pressure from the dispensing chamber 55.

The high pressure dispensing chamber enables the ready and quick application of lubricant to various grease cups or other chambers, such for instance as may be located at various portions of an automobile and into which it is desirable to force the lubricant at high pressure. This is desirable especially in lubricating shackles, spring joints and other organizations.

Various changes and modifications may be made without departing from the spirit of the invention as claimed.

What is claimed is:

1. In a grease measuring and dispensing apparatus, a main chamber in which there is a pneumatically operated piston, an inwardly opening check valve arranged in an intake port of the chamber, a discharge means leading from the chamber at the same end thereof with the intake valve, means for supplying air under pressure between a head end of the chamber and the said piston, a separate pneumatically operated returning means connected to the piston and comprising a tubular chamber secured to said head, and a rod attached to said piston and slidably mounted in said last named head end for operating an indicating device.

2. In a grease measuring and dispensing apparatus, a main chamber in which there is a pneumatically operated piston, an inwardly opening check valve arranged in an intake port of the chamber, a discharge means leading from the chamber at the same end thereof with the intake valve, means for supplying air under pressure between a head end of the chamber and the said piston, a separate pneumatically operated returning means connected to the piston and arranged exterior to and mounted on the head of the cylinder, and a rod attached to said piston and slidably mounted in said last named head end for operating an indicating device.

3. In a grease measuring and dispensing apparatus, a main chamber in which is operative a piston, a check valve for admitting a supply of grease into the chamber on the retracting stroke of the piston, means exterior to said chamber and connected to the piston therein for retracting the piston, and a supplementary discharge chamber having a piston and connections between the piston in the main chamber and the piston in the supplementary chamber to discharge substance from one or both of said chambers, as desired.

4. In a grease measuring and dispensing apparatus, a main chamber with a valved inlet port, a head at one end of said chamber, a piston operative in the chamber and having a piston rod extending through said head, means for supplying a fluid under pressure between the piston and said head to move the piston on a discharge stroke, discharge means leading from the chamber, means exterior to the chamber and arranged on said head for effecting the return of said piston, and a rod attached to said piston and slidably mounted in said last named head end for operating an indicating device.

5. In a grease measuring and dispensing apparatus, a main chamber with a valved inlet port, a head at one end of said chamber, a piston operative in the chamber and having a piston rod extending through said head, means for supplying a fluid under pressure between the piston and said head to move the piston on a discharge stroke, discharge means leading from the chamber, means exterior to the chamber and arranged on said head for effecting the return of said piston, and a rod attached to said piston and slidably mounted in said last named head end for operating an indicating device.

6. In combination with a grease dispensing and measuring apparatus, a main chamber to contain the grease to be dispensed, a piston operated on one stroke therein to discharge the grease, means for effecting a discharge stroke and a retracting of the piston, a fixed scale, a rod connected to the piston, and an indicating device moved on the scale by the rod on the discharge stroke, said rod being returnable independently of the indicating device.

In testimony whereof we have signed our names to this specification.

RICHARD CALLAHAN.
STEPHEN ROULEAU.